No. 850,130.  
PATENTED APR. 16, 1907.  
N. A. BOWEN.  
DETACHABLE TEMPLE FOR SPECTACLES.  
APPLICATION FILED NOV. 27, 1905.
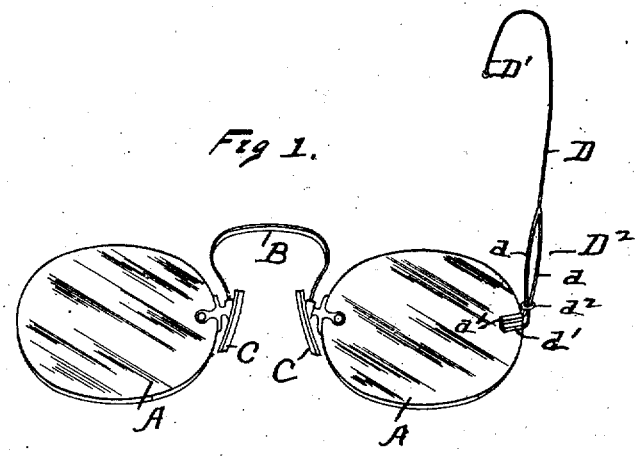
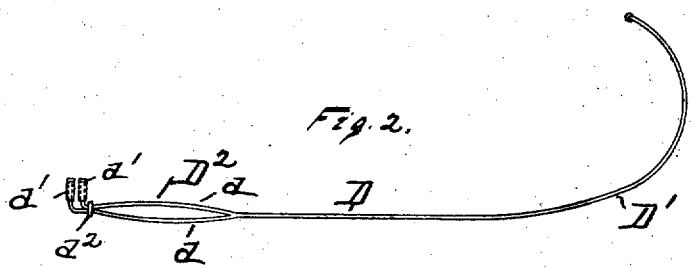
Witnesses  
Gertrude Rainsford  
S. B. Drake
Inventor  
Nelson A. Bowen  
by W. C. Lord  
Attorney

UNITED STATES PATENT OFFICE.

NELSON A. BOWEN, OF ERIE, PENNSYLVANIA.

DETACHABLE TEMPLE FOR SPECTACLES.

No. 850,130.  Specification of Letters Patent.  Patented April 16, 1907.

Application filed November 27, 1905. Serial No. 289,280.

*To all whom it may concern:*

Be it known that I, NELSON A. BOWEN, a citizen of Canada, residing at Erie, in the county of Erie and State of Pennsylvania, have invented new and useful Improvements in Detachable Temples for Spectacles, of which the following is a specification.

This invention relates to detachable temples for spectacles, and consists in certain improvements in the construction thereof, as will be hereinafter fully described, and pointed out in the claims.

More particularly, the temples forming the subject of this invention are designed for use in what are commonly known as "eyeglasses," the same being auxiliary to the ordinary nose-clip.

The invention is illustrated in the accompanying drawings, as follows:

Figure 1 shows a rear elevation of a pair of eyeglasses to which a temple forming the subject of my invention is attached. Fig. 2 shows a side elevation of the temple.

A marks the eyepiece, B the spring-clip, and C the grip. These are of the ordinary construction. The temple D is provided with the earpiece $D'$ and with the clamping end $D^2$. The end $D^2$ is bifurcated, having the prongs $d\ d$, the ends of which are bent inwardly, forming the jaws $d'\ d'$ of the clamp. These jaws are preferably rubber covered by means of minute rubber tubing. A ring $d^2$ is arranged around the prongs $d\ d$ adjacent to the jaws $d'$. It is preferably fixed with relation to one of the prongs, the other of the prongs being free to slide through it.

The prongs $d\ d$ are formed of resilient material and normally assume the position shown in the drawings at some distance apart. When they are pressed together, it bends the jaws $d'$, attached to the shorter prong, to the rear and the jaw $d'$, attached to the longer prong, toward the front, thus opening the clamp, so that the eyepiece may be inserted. On releasing the prongs their tension is exerted upon the jaws, thus securing them to the eyepiece.

By the use of the term "temple" I wish to be understood as including any part which extends from the side of the eyepiece to the side of the head for securing the eyepiece in place.

What I claim as new is—

1. A detachable temple for spectacles comprising a part for attachment to the head and a clamp comprising the bifurcated end of the temple the branches of which extend lengthwise of the temple ending in the jaws of the clamp arranged at an angle to the branches, the jaws of the clamp being operated by the relative movement of the prongs forming the bifurcated ends.

2. A detachable temple for spectacles comprising a part for attachment to the head; a clamp comprising the bifurcated end of the temple the branches of which extend lengthwise of the temple ending in the jaws of the clamp arranged at an angle to the branches, the jaws of the clamp being operated by the relative movement of the prongs forming the bifurcated ends; and a ring arranged around the prongs adjacent to the jaws of the clamp.

3. A detachable temple for spectacles comprising the part for attachment to the head; and a clamp including a bifurcated end of the temple and jaws extending therefrom, the prongs of the bifurcated end being normally apart and arranged relatively to the jaws to open the jaws as the prongs are pressed together.

4. A detachable temple for spectacles comprising the part for attachment to the head; a clamp including a bifurcated end of the temple and jaws extending therefrom, the prongs of the bifurcated end being normally apart and arranged relatively to the jaws to open the jaws as the prongs are pressed together; and means arranged on the prongs adjacent to the jaws for securing the prongs together, one of said prongs being free to slide in said means.

5. A detachable temple for spectacles, comprising the part for attachment to the head and a clamp including a bifurcated end of the temple and jaws extending at an angle therefrom, the prongs of the bifurcated end being normally apart and arranged relatively to the jaws to open the jaws when the prongs are pressed together.

In testimony whereof I have hereunto set my hand in the presence of two subscribing witnesses.

NELSON A. BOWEN.

Witnesses:
 PAUL A. BENSON,
 P. CRIBBINS.